US008750595B2

(12) United States Patent
Stellari

(10) Patent No.: US 8,750,595 B2
(45) Date of Patent: Jun. 10, 2014

(54) REGISTERING MEASURED IMAGES TO LAYOUT DATA

(75) Inventor: Franco Stellari, Waldwick, NJ (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 12/898,867

(22) Filed: Oct. 6, 2010

(65) Prior Publication Data

US 2012/0087568 A1   Apr. 12, 2012

(51) Int. Cl.
G06K 9/00   (2006.01)

(52) U.S. Cl.
USPC ........................................................ 382/149

(58) Field of Classification Search
None
See application file for complete search history.

(56) References Cited

U.S. PATENT DOCUMENTS

| | | | |
|---|---|---|---|
| 6,172,512 B1 | 1/2001 | Evans et al. | |
| 6,483,327 B1 | 11/2002 | Bruce et al. | |
| 6,771,077 B2 | 8/2004 | Hamamura et al. | |
| 6,895,373 B2 | 5/2005 | Garcia et al. | |
| 6,943,572 B2 | 9/2005 | Desplats et al. | |
| 6,943,578 B1 | 9/2005 | Sanda et al. | |
| 7,245,133 B2 | 7/2007 | Tsao et al. | |
| 7,400,154 B2 | 7/2008 | Desplats et al. | |
| 8,072,589 B2* | 12/2011 | Khurana | 356/237.1 |
| 8,131,056 B2* | 3/2012 | Polonsky et al. | 382/141 |
| 8,331,726 B2* | 12/2012 | Stellari et al. | 382/284 |
| 2010/0192112 A1* | 7/2010 | Nakazato | 716/4 |
| 2011/0026806 A1* | 2/2011 | Bernstein et al. | 382/145 |

OTHER PUBLICATIONS

Failure Analysis Group. "Photon Emission Microscope (PEM)" Failure Analysis Group. Section 514. PEM 2005. 2005. (2 Pages) http://parts.jpl.nasa.gov/docs/PEM2005.pdf.

Feuerbaum, C. "Development of Calibration Methods for a Photon Emission Microscope to Analyse Light Emitted From Semiconductor Detectors" MPI Semiconductor Laboratory and the Physik-Department Technische Universitat Munchen. Jan. 2008. (86 Pages) http://www.hll.mpg.de/07_publication/2008/Dipl01-08_Ch-Feuerbaum.pdf.

Holland, K.L., et al. "Addressable Defect Monitor Design Utilizing Photo-Emitting Fault Location" IP.com Prior Art Database. Technical Disclosure. www.ip.com. Sep. 1987. (3 Pages) http://www.ip.com/pubview/IPCOM000040083D.

Stellari, F., et al. "High-Voltage and High-Power PLL Diagnostics Using Advanced Cooling and Emission Images" Proceedings of International Test Conference, (ITC). Oct. 2006. pp. 1-10.

Stellari, F., et al. "Mapping Systematic and Random Process Variations Using Light Emission From Off-State Leakage" Proceedings of International Symposium on Physics and Reliability (IRPS). Apr. 2009. (10 Pages).

Song, P., et al. "A Novel Scan Chain Diagnostics Technique Based on Light Emission From Leakage Current" Proceedings of International Test Conference, (ITC), Nov. 2004, pp. 140-147.

* cited by examiner

*Primary Examiner* — Samir Ahmed
(74) *Attorney, Agent, or Firm* — Tutunjian & Bitetto, P.C.; Anne V. Dougherty

(57) ABSTRACT

A system and method for registering a layout to a measured image includes generating a predictive reference image from a layout design or portion thereof. The predictive reference image is correlated to a measured image obtained from a device having a corresponding structure for the layout design or the portion thereof. A best match transformation is computed between the predictive reference image and the measured image. The layout design or portion thereof is correlated with the measured image based upon the best match transformation.

18 Claims, 10 Drawing Sheets

300

Processed image

Highest correlation identified for a relative translation of:
dx=-1708 and dy=-398

REGISTERING MEASURED IMAGES TO LAYOUT DATA

GOVERNMENT RIGHTS

This invention was made with Government support under Contract No.: S10-105185 awarded by the Defense Advanced Research Projects Agency (DARPA). The Government has certain rights in this invention.

BACKGROUND

1. Technical Field

The present invention relates to image collection and comparison and more particularly to systems and methods for aligning layout designs with measured images.

2. Description of the Related Art

Time-integrated (static) images of both switching and leakage emission are a key tool for testing and characterizing modern VLSI circuits. Common to many techniques is the necessity of precisely correlating an emission pattern with a layout of the circuit under test. In this way, emission spots can be associated with a certain transistor, gate, sub-circuit and properly interpreted, for example, to reconstruct a logic state of the gate. Achieving this precise registration is not trivial, often requires a lot of custom manual work and is prone to error and user interpretation.

In some other cases, for example, an area suspected in an emission image needs to be traced back to the correct location in the chip layout with very precise registration. Again, such a task of tracing back a small portion of the chip emission acquired at high magnification to its unknown location in a chip layout is not trivial and very time consuming even when done manually by an experienced tool operator.

For navigation purposes, this problem is approached in some tools by using a three (or more) point alignment. In particular, some specific locations in the layout and in the light reflected pattern image of the chip are selected and correlated so that the entire layout could be transformed using linear transformations and drawn over the reflected light pattern image. Although, this allows for simple navigation of the chip, a precise alignment at the local level is never achieved. In other cases, the reflected light pattern image is correlated with the layout while the tool is calibrated so that the emission image is aligned with the reflected light image. Unfortunately, the correlation is rarely realized due to sample thickness variations, temperature changes, material differences, etc. Even if the layout is perfectly aligned with the pattern image, it is not well aligned with the emission image. as the quality of reflected light images is insufficient for a precise sub-micron alignment with a layout.

SUMMARY

A system and method for registering a layout to a measured image includes generating a predictive reference image from a layout design or portion thereof. The predictive reference image is correlated to a measured image obtained from a device having a corresponding structure for the layout design or the portion thereof. A best match transformation is computed between the predictive reference image and the measured image. The layout design or portion thereof is correlated with the measured image based upon the best match transformation.

Another method in accordance with the present principles includes generating a predictive reference image from a layout design or portion thereof; correlating the predictive reference image to a measured image obtained from a device having a corresponding structure for the layout design or the portion thereof; computing a best match transformation between the predictive reference image and the measured image; correlating the layout design or portion thereof with the measured image based upon the best match transformation with the predictive reference image; overlaying the measured image and the layout design or portion thereof; and if an overlay of the measured image and the layout design or portion thereof is not satisfactory, modifying image processing to improve the overlay.

A system in accordance with the present principles includes an optical instrument including an imaging device for collecting images of a device of interest and a computer configured to process images collected by the imaging device, the computer including a processor and a memory coupled to the processor. The memory includes a tool for registering a layout design to a measured image. The tool is configured to generate a predictive reference image from a layout design or portion thereof; correlate the predictive reference image to a measured image obtained from the device having a corresponding structure for the layout design or the portion thereof; compute a best match transformation between the predictive reference image and the measured image; and correlate the layout design or portion thereof with the measured image based upon the best match transformation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
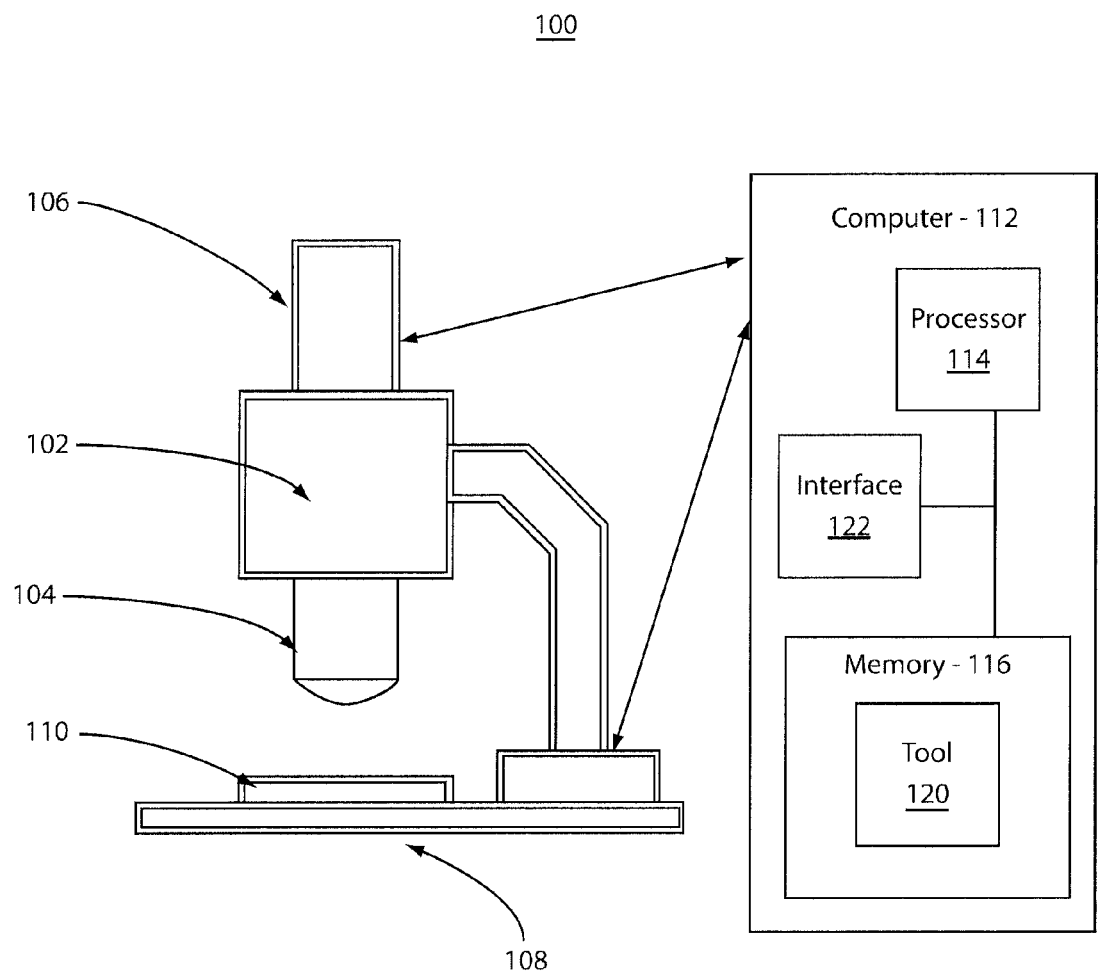
FIG. 1 is a diagram showing a system for registering a layout design with a measured image in accordance with one illustrative embodiment.

In accordance with the present principles, systems and methods for registering an emission or measured image to layout shapes, and vice versa are provided. Layout layers and shapes are processed to identify the layout layers and shapes that contribute to a particular emission pattern. In one example, gates are connected to a clock distribution network when switching activity is measured through an emission measurement. In another example, gates or sub-circuits that are expected to be exercised by a particular test or functional pattern may be selected. Once layout shapes are properly scaled to match a magnification used during the emission measurement, polygons are processed to create a "predictive reference image" predicting some feature highlighted in the emission measurement. A two dimensional (2D) cross correlation technique can then be used to precisely align the emission and layout predictive reference image. Using the emission image directly for the alignment avoids several passes, which would be prone to errors, to focus on a result of interest. Additionally, the emission image is intrinsically more selective because it is related only to active areas of transistors and gates.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Mathematical, scientific, and instrument control software packages may be used as well, such as Matlab™, Mathematica™, AutoIt™, Perl™, TCL™, LabView™, and Labwindows™, etc. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a time integrated emission tool 100 includes a microscope 102 with an objective lens 104 and a camera 106 mounted on a positioning stage 108. A computer 112 or other processing device with memory is employed to automate or otherwise run procedures on the tool 100. The tool 100 is employed to acquire emission from a test sample (device under test, DUT) 110. An example of optical tools of this kind that can be adapted for use in accordance with the present principles include the Phemos™ family of emission tools from Hamamatsu™, the Meridian™ platform from DCG Systems™, various optical tools from Quantum Focus Instruments™, and many others.

Optics for the microscope objective lens 104 may include a Solid Immersion Lens (SIL). The camera 106 may be employed for acquiring the emissions and may vary significantly depending on the characteristics of the emissions from DUT 110 and the purpose of the measurements. Some examples of a camera 106 include silicon Charge Coupled Devices (CCDs), Silicon Intensified CCD, InGaAs cameras, Mercad (MCT) cameras, and many other types of time-integrated (or static) cameras. The present principles are applicable to any camera 106 capable of creating 2D images of the emission, including time resolved 2D PICA cameras such as the one commercialized by Hamamatsu™, as well as 2D images created by raster scanning single pixel detectors. The computer or control unit 112 is connected to both the camera 106 and the translation stage 108. Other optical tools and components may also be included so that emissions can be acquired and analyzed using software. The movement of the stage 108 can be controlled accurately, repeatably, and easily by the computer 112.

The computer 112 is also configured to process images collected by the imaging device or camera 106. The computer 112 includes one or more processors 114 and a memory 116 coupled to the processor(s) 114. The computer 112 includes a user interface 122 to permit user input or other inputs into the computer 112. The memory 116 includes a tool 120 for registering a layout design to a measured image.

The tool 120 includes image processing capabilities and may employ measurement and/or test conditions as inputs. The tool 120 is configured to, among other things, generate a predictive reference image from a layout design or portion thereof, correlate the predictive reference image to a measured image obtained from the device having a corresponding structure for the layout design or a portion thereof, compute a best match transformation between the predictive reference image and the measured image, and correlate the layout design or portion thereof with the measured image based upon the best match transformation. More details of the tools capabilities are described with reference to FIGS. 2-12, hereinafter.

In accordance with one illustrative embodiment, emission images are employed as a measured image. However, other images may also be employed. Emission images are described in terms of pixels and their intensity. Each image has a certain number of pixels covering a fixed area of the circuit, defined by the camera pixel size and microscope magnification. For example, a pixel of an emission image acquired with a detector at 100× magnification could be corresponding to a 0.2 µm×0.2 µm area on the chip. The value of each pixel is a direct or indirect measure of the emission intensity coming from that area of the chip. Higher intensity corresponds to larger pixel values.

A circuit layout may be described by polygon shapes. These shapes may be stored in memory 116. The shapes may be on many layers that define how structures on a chip are constructed during a fabrication process. These formats are incompatible and are not well suited for automating registration. In most cases, the emissions measured by optical tools are generated in the active areas of transistors and gates and not from back-end-of-line structures (e.g., metal lines, etc.). Therefore, many of the shapes included in a common layout are of very little interest for layout registration based on emission.

Figure 2:
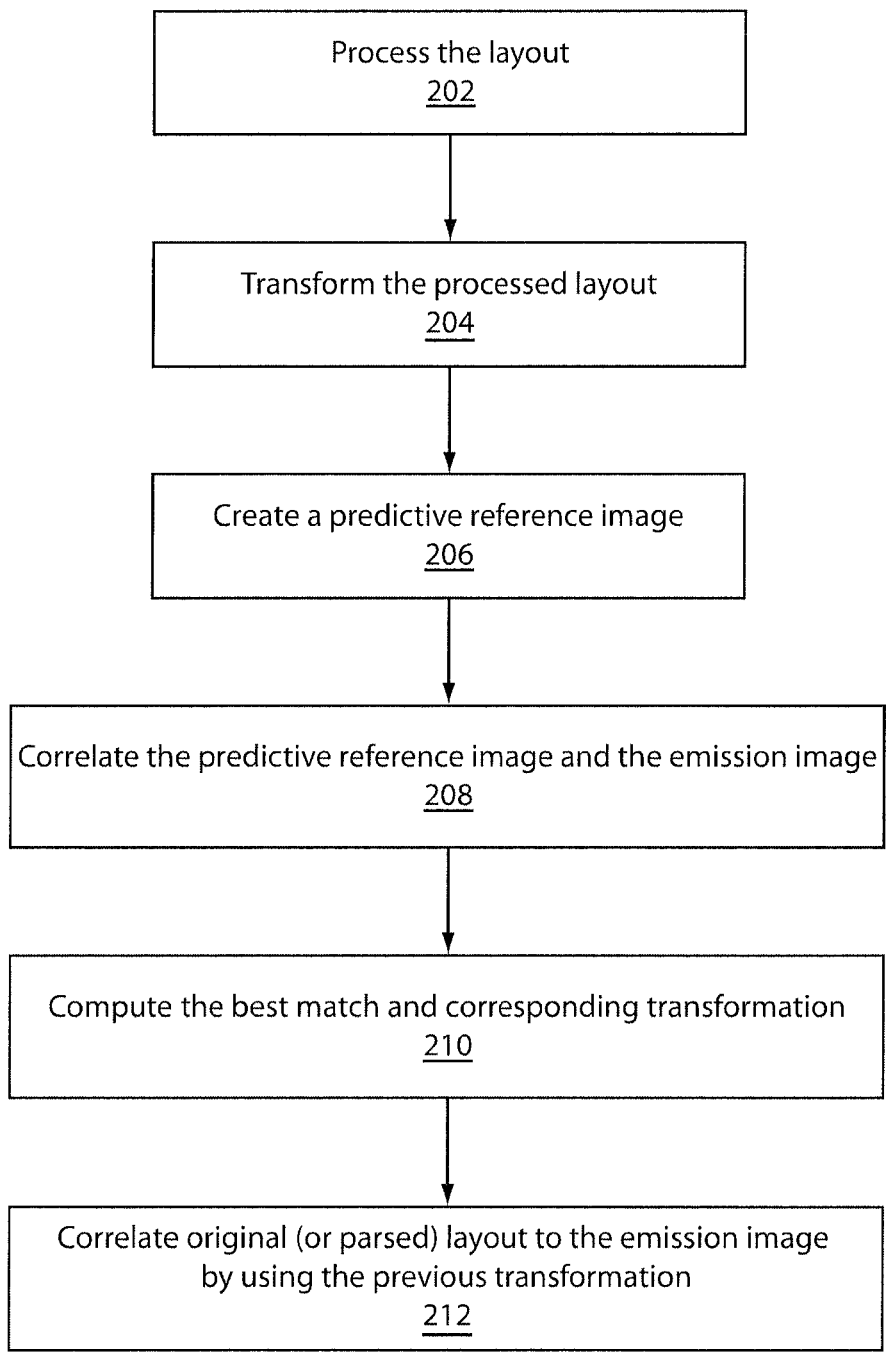
FIG. 2 is a block/flow diagram for a system/method for registration of a layout with a measured image in accordance with one embodiment.

Referring to FIG. 2, a method for layout-emission registration or overlay is illustratively shown in accordance with one exemplary embodiment. In block 202, a layout is processed to identify certain polygons of interest. A layout refers to the architecture, plan, design or configuration of a device under test or specimen. One example of a layout is a semiconductor chip configuration. The layout is processed to lump regions into useful polygon shapes. This may be limited to particular areas and may be based on the image being considered in view of the microscope or other optical tools. In block 204, the layout is transformed to match expected chip orientation and scaling. In block 206, a "predictive reference" image is created from the layout polygons representing the expected (theoretical) location of emission spots as if they had been acquired in a measurement. In block 208, the "predictive reference" image (based on the layout) is correlated with a real emission measurement to identify a best match and a necessary transformation. In block 210, the calculated transformation is applied to the original layout polygons, or an application representative subset of them (for example, a spatially limited layout pattern for a certain region of interest or a limited pattern for certain levels of the layout, e.g., a front end of the line (FEOL) to overlay them with the emission image.

In one possible embodiment, block 202 may include, for example, selecting only the layers in a certain region of interest. In another embodiment, block 202 may include selecting only certain layers of the layout connected with generating emissions, for example, front end of the line structures (diffusion regions, channels, etc.). In another embodiment, certain layers may be intersected or combined to create new polygons that better represent the expected source of an emission. For example, the layer corresponding to a transistor gate polysilicon may be intersected with the layer defining a transistor channel to create a new set of polygons corresponding to the active areas of the circuit causing an emission. Additionally, such new layer may be intersected with a layer defining low threshold voltage (Vt) transistors, thus identifying the brightest gates on the chip. Any combination of these and other methods may also be employed.

In block 204, the resulting parsed layout may be further manipulated through transformations such as scaling, rotation, flipping to match the expected magnification and orientation of the chip based on the conditions during the emission image acquisition. For example, if the chip is measured through the backside of the silicon, a left-right flipping of the layout may be necessary to match the two of them. Additionally, an emission image acquired with a 20× lens versus a 100× lens will need different scaling of the layout. Block 204 could be applied to the emission image instead of the layout to achieve appropriate matching. However, the emission image is usually the key data during an experiment and transformations, such as rotations of small angles, may cause artifacts in the image that are undesirable. Therefore, it is preferable to apply the changes to the layout.

In block 206, a "predictive reference" image is created from the layout. This includes constructing an "artificial" image with the same pixel size of the emission image and enough pixels to cover the entire layout of interest for the application after previous processing and transfoimation steps. For example, if the layout is 100 μm wide and the pixel size is 0.2 μm, an image with at least 500 pixels wide will be created (and appropriate height depending on the layout size). In many cases, a slightly larger image may be created to avoid problems at the edges. The image is preferably created empty, e.g., every pixel is set at a value of 0. Subsequently, the layout shapes are analyzed and corresponding pixels of the "predictive reference" image may be set to a value different from 0. In some cases, all values would be the same (for example, 1). In other cases, different numerical values could be assigned to weight the "predictive reference" image. For example, expected brighter emission areas, or key features that need prominent consideration during the correlation process may be weighted or assigned a higher pixel value.

Of particular interest is also the case when the "predictive reference" image is created from only a portion of the circuit layout database, for example from a spatial region of interest (ROI) for the particular application. Given that circuit layout may be very large in spatial size and therefore occupy a lot of memory, it may be in fact convenient, and often necessary, to limit the size of the "predictive reference" image. This can be achieved, for example, by preliminary analysis of the location where the measured image is acquired so that only a limited region of the layout around the location of interest may be processed to create the "predictive reference" image. Usually, the region processed is chosen larger than the measured image to allow for tool drifts and imprecision in the location selection. If multiple locations of the circuit are measured during several "measured" images, multiple "predictive reference" images may be necessary, one for each location of the measured image.

In one possible embodiment, all the pixels of the "predictive reference" image that fall inside a perimeter of a layout shape corresponding to an emission source are modified to a value >0. In another embodiment, the center or baricentrum of a layout shape is calculated first and only the pixel of the "predictive reference" image corresponding to such location is changed to a value >0. In still other embodiments, the pixel may be enlarged to cover adjacent pixels, thus making a larger target. Additional ways to create the "predictive reference" image are also contemplated and within the scope of the present invention.

In block 208, the "predictive reference" image and real emission image are correlated, for example, using 2D cross correlation or correlation methods that permit identification in a statistical way of a best X and Y translation that guarantees a best matching of the layout and emission image. In particular, if the location of the emission region is known, a small portion of the layout may have been selected (to speed up the process and reduce resource consumption) to achieve a very fine alignment. Alternatively, if the location of the emission is not known in relation to the layout, the entire layout may be processed so that the correlation step identifies the best area of the layout matching the measured emission image.

If a precise scaling, rotation or flipping of the layout is not precisely known, these parameters may be easily included in the optimization method. In particular, referring to the precise scaling of the layout to match the "measured" image, a set of different scaling factors may be considered, for each scale factor a "predictive reference" image is created and correlated to the "measured" image. For each "predictive reference" image a figure of merit is calculated that measures the quality of the correlation achieved. The scaling factor corresponding to the correlation with the highest figure of merit is chosen as the best match and the corresponding layout and predictive reference image may be used for the overlay with the "measured" image. A procedure for determining the scaling, rotation, flipping etc. is described in FIG. 12

Of particular interest is the case where the location of the "measured" image is not known, a priori, or cannot be estimated with sufficient confidence, but the "predictive reference" image of the entire layout would just be too large for convenient processing and memory storage. In this case, the layout may be subdivided into several regions of interest, these may be non-overlapping or partially overlapping, such that the corresponding "predictive reference" image is sufficiently larger than the "measured" image, but at the same time, small enough to allow for quick processing and correlation with the "measured" image. A procedure for dividing and processing an image is described in FIG. 12.

The "measured" image is then correlated with each "predictive reference" image in the set similarly as in blocks 208 and 210. A figure of merit of the correlation quality is recorded for each "predictive reference" image, along with the location of the "predictive reference" image relative to the circuit layout. Once the process has been completed, the "predictive reference" image with the best, highest, figure of merit is chosen as the best match with the "measured" image. The previously recorded position of the "predictive reference" image is the used for the fine alignment of the original layout, or portion of it, to the "measured" image.

In most cases, the emission image may undergo post processing before the correlation in block 208. For example, low pass filtering may be used to improve the signal to noise and remove spurious peaks due to cosmic rays and alpha particles. In another embodiment, the image may be thresholded so that emission levels below (and/or above) a certain level are removed by setting them to 0, thus removing background noise (or excessively bright peaks due, for example, to circuit failures). In yet another embodiment, a gray scale image may be converted to binary format by means of a threshold. These and more combinations of standard image processing techniques may be adopted and selected in accordance with the present principles.

Having obtained the best overlay of the "predictive reference" image with the emission image, in block 210, an optimal transformation function is identified to maximize the matching of the "predictive reference" image with the emission or measured image. In block 212, the transformation is applied directly to the original (or the post processed or parsed layout, or portion thereof) layout so that the layout image can be matched to the original (or post processed/ parsed) emission image. Any additional function may be employed to analyze the layout based on the emission image overlay.

The following description is directed to a practical example to further illustrate the present principles. It should be understood that the description of this example should not be construed as limiting.

Figure 3:
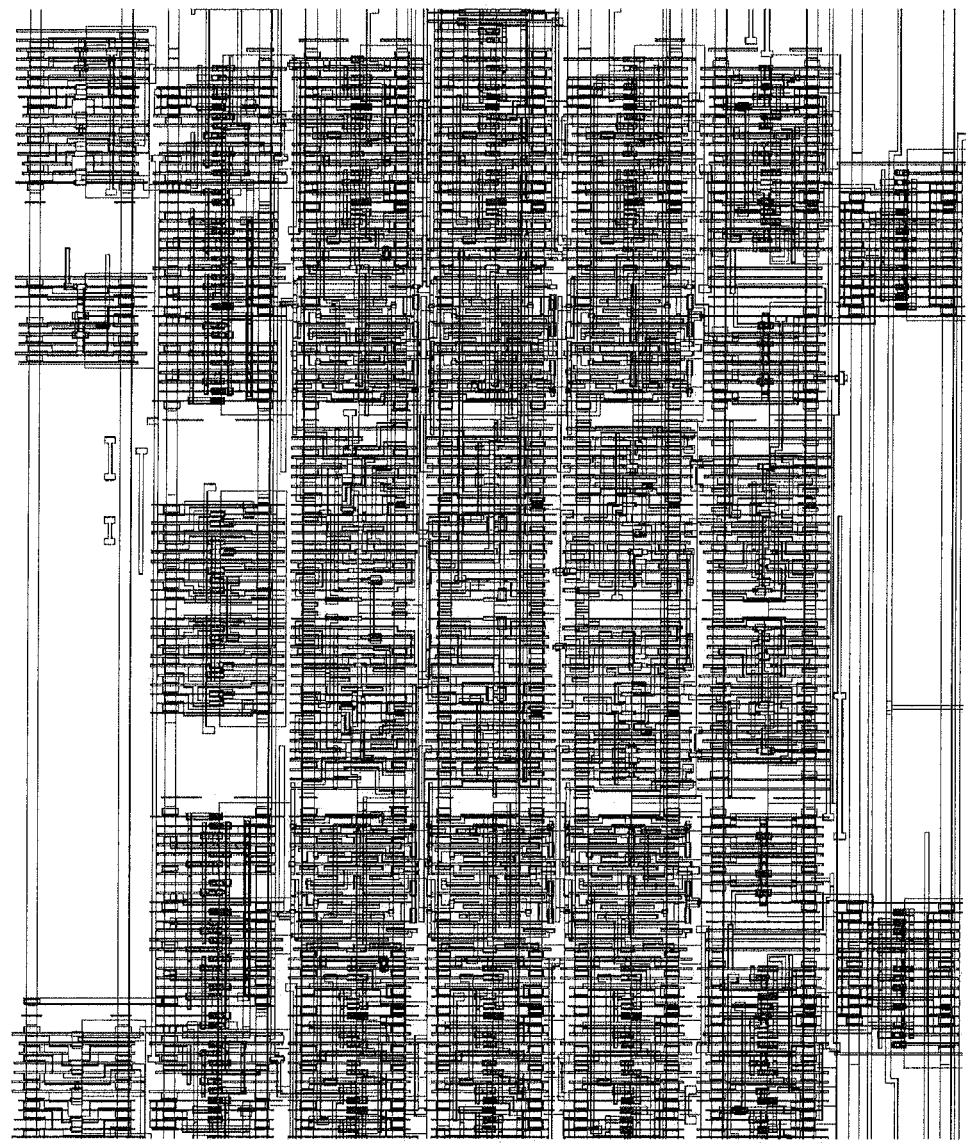
FIG. 3 is a diagram showing a portion of an illustrative chip layout in accordance with one example.

Referring to FIG. 3, a partial layout 300 of a sample under test (110) is shown.

Figure 4:
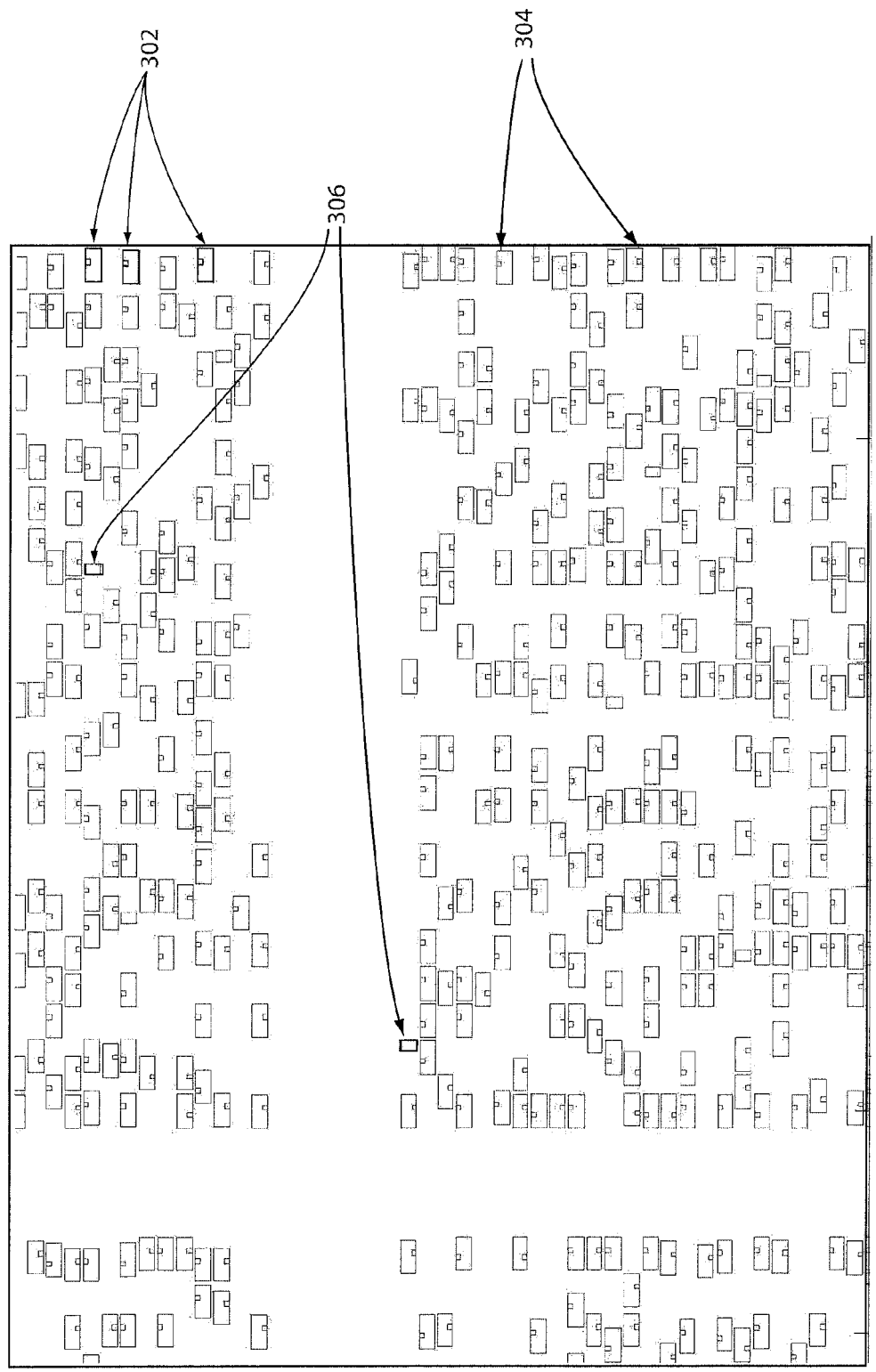
FIG. 4 is a diagram showing a magnified portion of the illustrative chip layout of FIG. 3.

Referring to FIG. 4, shapes 302 identify a perimeter of latches. A smaller rectangle 304 inside the latch perimeters identifies a location inside the latch where a clock is received by the latch. Shapes 306 are local clock buffers (LCB) of the chip. FIG. 4 shows the layout 300 after it has been processed by cropping a smaller area, scaling and rotating the image in accordance with blocks 202 and 204 of FIG. 2.

Figure 5:
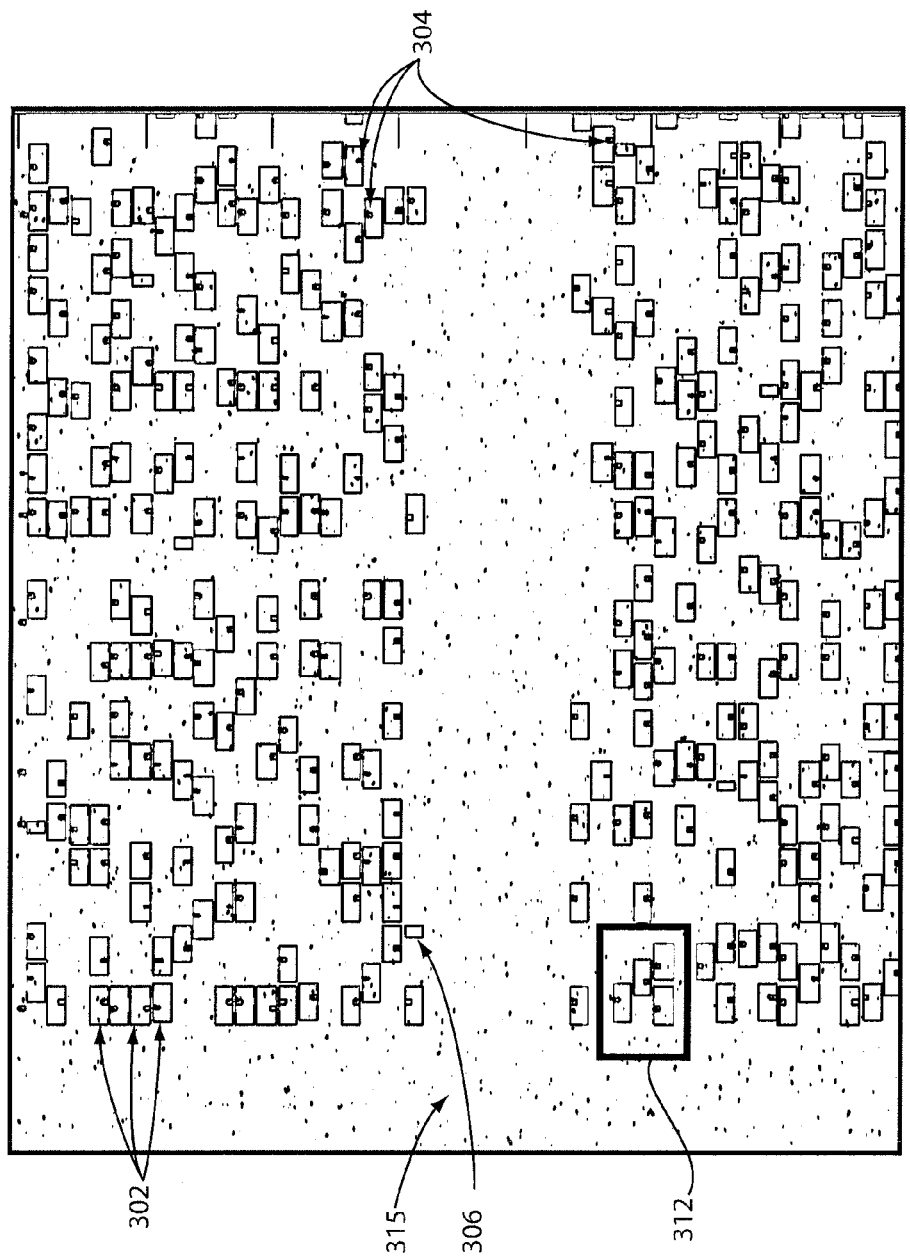
FIG. 5 is a diagram showing a predictive reference image created for the portion of the illustrative chip layout of FIG. 4.

Referring to FIG. 5, a predictive reference image 314 has been created in accordance with block 206. A region of interest 312 has also been identified. The layout predictive reference image includes processed layout shapes 302 (e.g., latch perimeters) overlaid on the predictive reference image.

The width/height of the predictive reference image may be chosen to be similar to the emission image sizes. The pixel size of the predictive reference image is chosen to match the emission image pixel size. In this case, the predictive reference image is "0" where no emission is expected and "1" (or other positive weight) where emission is expected.

Figure 6:
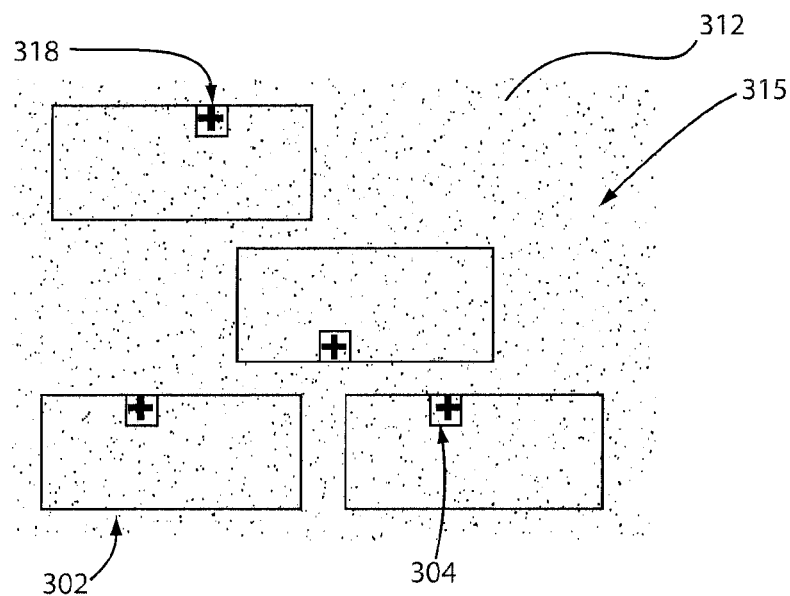
FIG. 6 is a diagram showing a magnified portion of the predictive reference image created for a portion indicated in a box in FIG. 5.

Referring to FIG. 6, the zoom-in detail 312 of FIG. 5 shows a small portion with only four latches 302. The "predictive reference" image 315 is set to 0 for the most part (corresponding to the false shaded regions) while locations 304 corresponding to a clocked portion of the latch are set to 1 (corresponding to the "+" or crosses 318). It should be noted that in this case, the technique of locating the center of a particular polygon and setting only the pixel corresponding to such polygon and the four neighbor pixels was employed. Other methods may have also been chosen.

The predictive reference image 315 is "0" (shaded) where no emission is expected and "1" (crosses 318) where emission is expected. Different weights may be used for different types of expected emissions to increase effectiveness. For example, bright LCB's may be weighted more (>1) than smaller gates. Note that the boxes and the crosses are not part of the predictive reference image but are only overlaid here for verifying the alignment and demonstrating the present principles.

Figure 7:
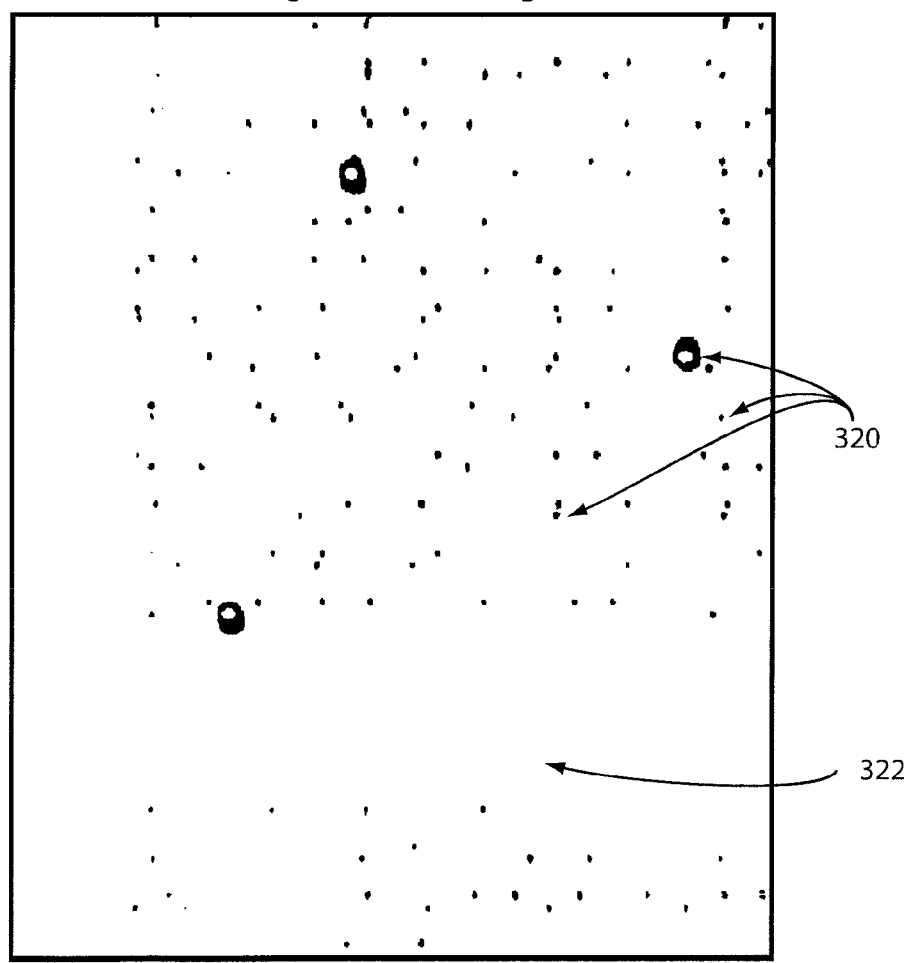
FIG. 7 is an original image showing emissions from a structure corresponding to the layout of FIG. 4.
Figure 8:
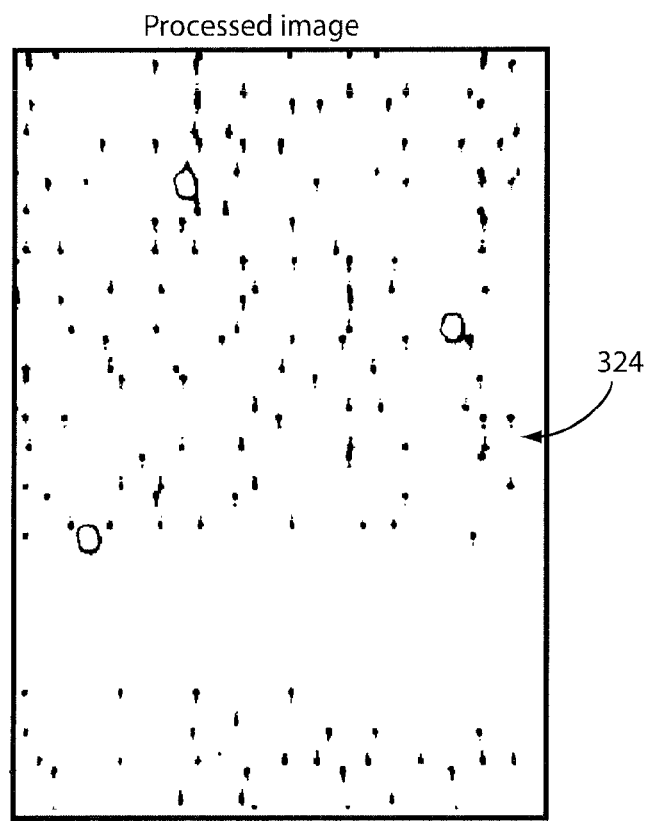
FIG. 8 is a processed image of the image depicted in FIG. 7.

Referring to FIG. 7, an example emission image is shown. The emission image was acquired from the device under test. Light colors 320 indicate stronger emission, while dark colors 322 indicate background with noise and small or no emission. In this case, it was decided to post process the emission image by removing regions with emissions that were too weak or too bright. A post processed image 324 of emissions is shown in FIG. 8. This permits easier identification of the features of interest. In this case, the clocked portion of the latches, so that the correlation may work more efficiently.

The expected emission predictive reference construction may include different options. For example, one option may include a single pixel corresponding to the center/baricentrum of the expected emission. Another option may include multiple pixels matching the shape and dimensions of the expected emission as calculated from the layout. In another option, multiple pixels organized in particular geometric shapes to enhance the signal to noise ratio (SNR) of the correlation used, e.g., a "+" shape can optimize translation calculations. In FIG. 8, the processed emission image 324 may be filtered, cropped, scaled, etc. These processes may be employed to conform the emission image and remove undesirable areas. Low emission areas may be removed to reduce noise background. Emission areas corresponding to defects, fails, etc. may be removed, e.g., very bright emission spots that are not expected may be removed from the layout predictive reference.

Figure 9:
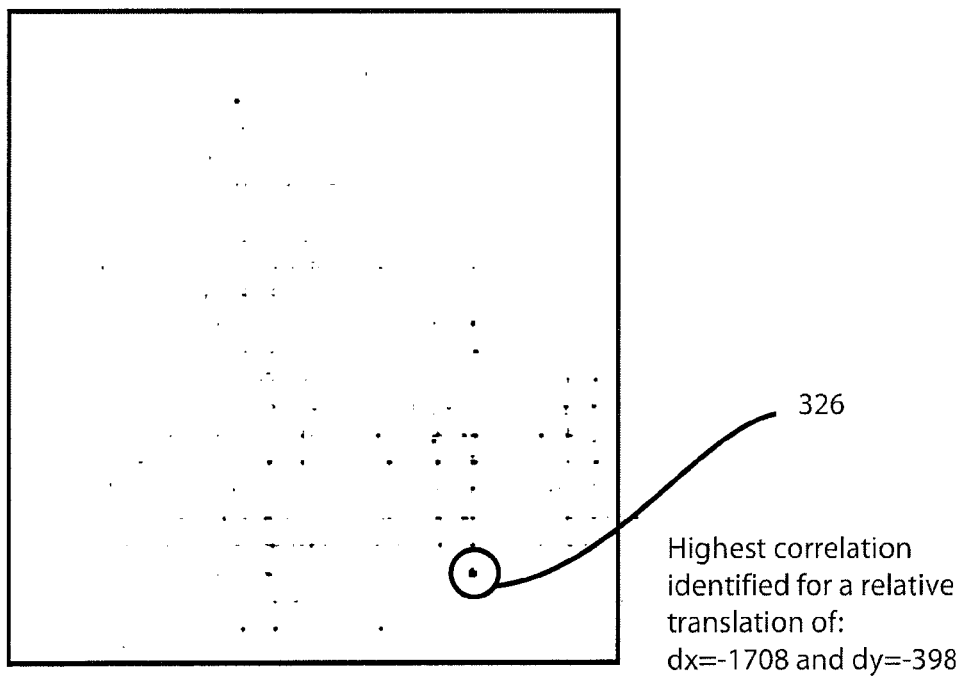
FIG. 9 is an image showing a computed correlation between the predictive reference image and the measured image.

Referring to FIG. 9, the results of the correlation as described in block 208 are illustratively shown. A highest correlation point or points (best match) 326 are identified (block 210) and a relative translation coordinate is provided to permit an alignment between the real emission image and the predictive reference image that include the layout design (e.g., polygons or other reference shapes).

Figure 10:
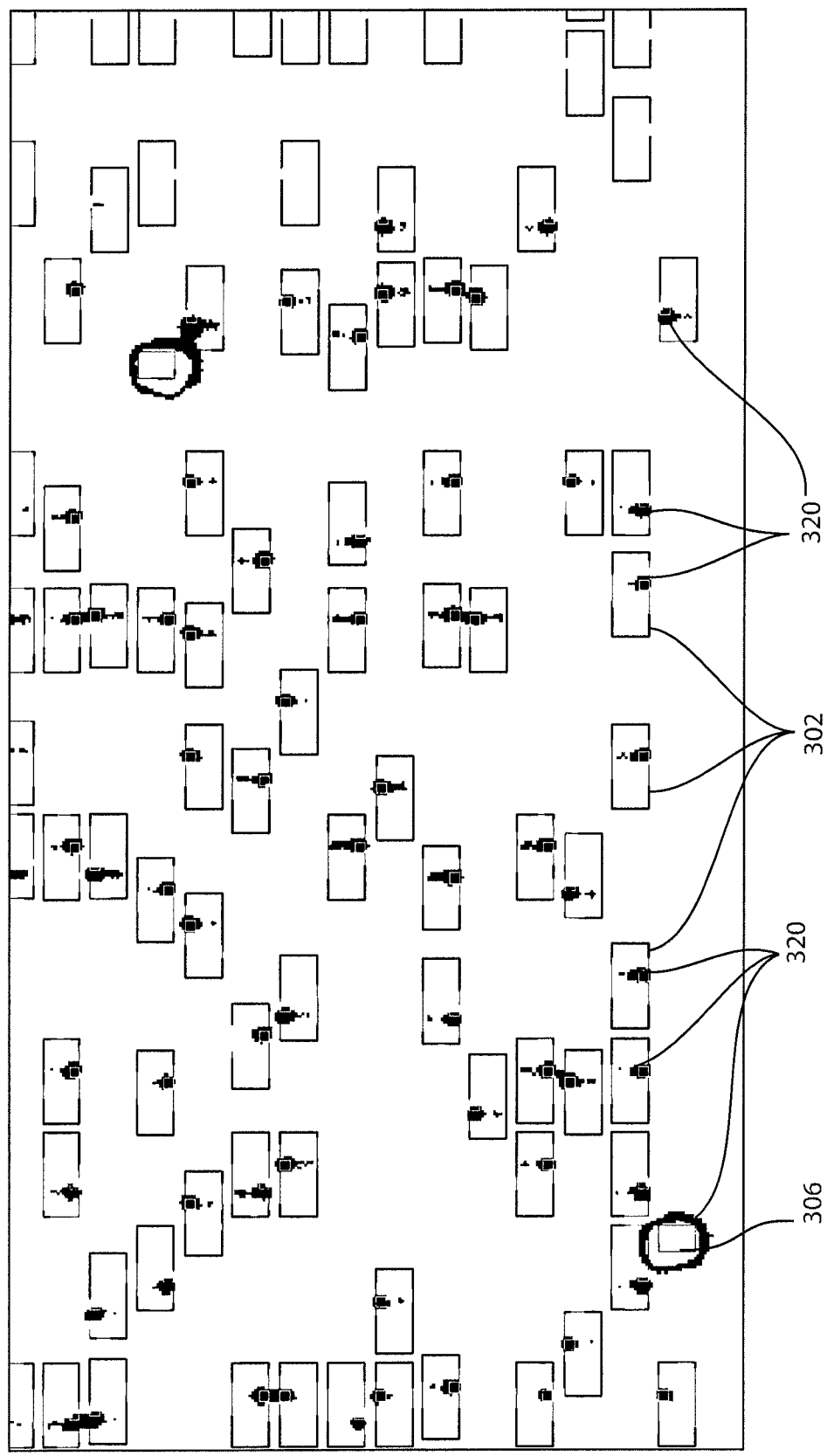
FIG. 10 is an image showing alignment between a layout design and an emissions image using the correlation in FIG. 9.

Referring to FIG. 10, block 212 is applied to the layout and the processed emission image, and the result of the alignment is shown. In this example, elements of interest are shown (e.g., latches 302, LCBs 306, etc.) overlaid over the processed emission image (with bright emissions regions 320).

Once alignment between the predictive reference polygons or layout features is made to the processed emission image many useful features may be exploited. For example, the entire layout of interest can now be overlaid to the original emission image. The layout overlay can easily provide (x,y) scaling/dimensioning of the emission image, and facilitate identification and location of unexpected/anomalous emission regions, device failures, malfunctions, etc. The alignment further permits comparison between different chips or different conditions on a same chip. This permits an enormous advantage and benefit for device testing and device design. Chips of a same kind can be compared under the same electrical conditions to determine whether the response is the same or within acceptable tolerances. Statistics may be collected on individual components and compared for the same device on different chips. Once the layout overlay is provided, emissions can be allocated to different features/circuits or even individual devices. For example, statistics on latch emissions can be collected. Each latch may be compared to the statistics to determine whether the latch has failed, is operating normally or is operating abnormally. Useful information may be filtered to provide only the devices, or the responses of the devices that are desired.

The present principles may be applied to other applications as well other than for emission images. An appropriate predictive reference image may be generated which is capable of capturing any feature on a measured image for alignment. For example, a Laser Scanning Microscopy (LSM) image overlay may be obtained by generating a predictive reference image from the layout to weight the diffusions/implants of transistors and correlate the implants with "dark" regions of the LSM image (possibly after an inversion). Other applications are also contemplated.

Figure 11:
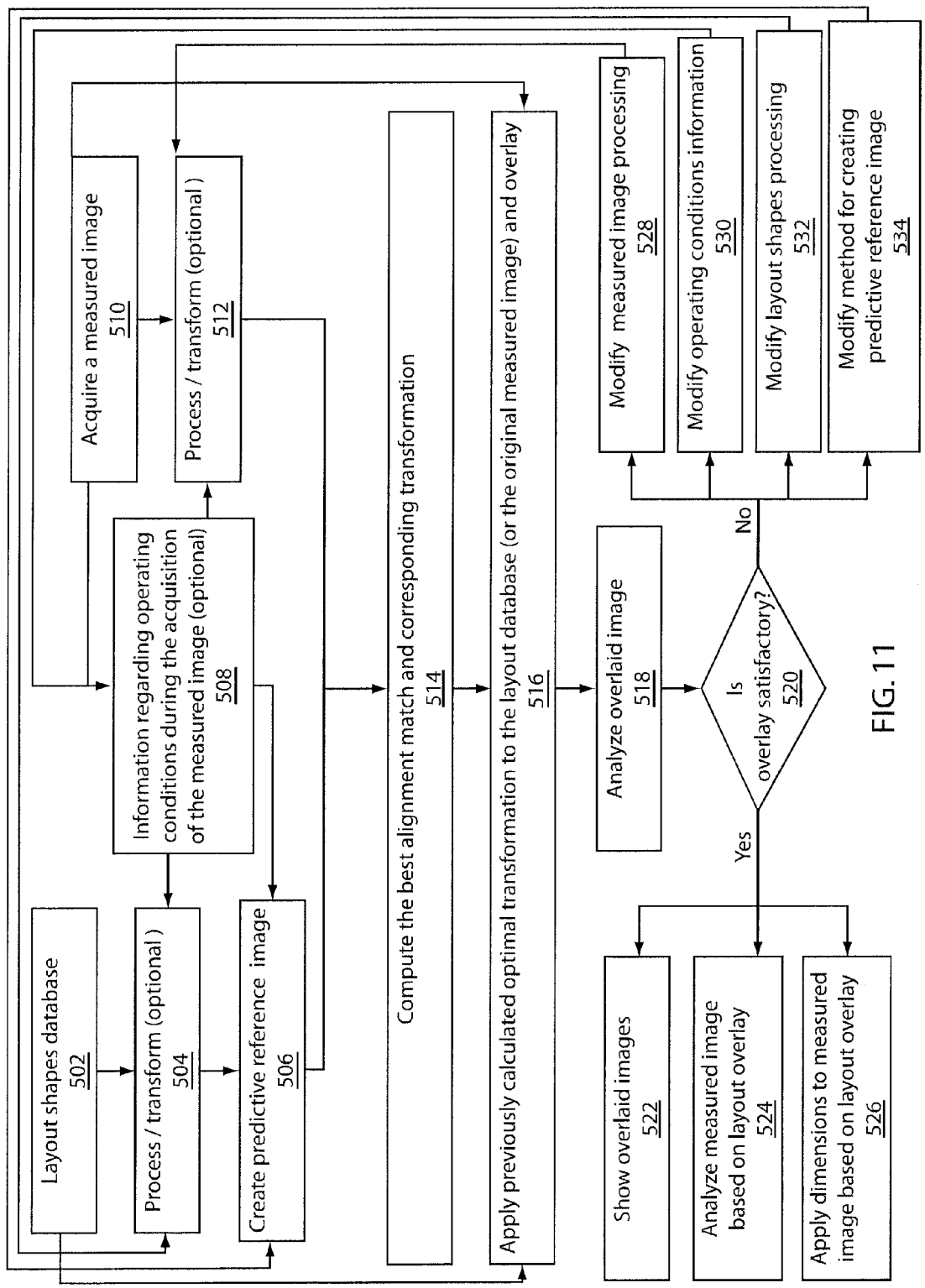
FIG. 11 is a block/flow diagram for a system/method for registration of a layout with a measured image having feedback for improving the overlay between the layout design and the emissions image in accordance with another embodiment.

Referring to FIG. 11, a block/flow diagram is shown for a system/method for overlay registration/alignment in accordance with another embodiment. In block 502, a layout shapes database is consulted to provide shapes (e.g., polygons) representing features on a device under test or other device of interest. The shapes are assigned to a layout which may include a design layout of a chip or integrated circuit. In block 504, the layout may optionally be processed or transformed. This may include filtering out portions of the design that are of lesser interest or not relevant to the task at hand, or zooming in on an area of interest, etc. In block 506, a predictive "predictive reference" image is created. The predictive reference image provides a pixel predictive reference, which employs pixel values corresponding with layout shapes and features of interest.

In block 510, a measured image is obtained, which may include an emission image, a laser scanned image, a photographic image, etc. In block 512, the measured image is optionally processed. For example, the measured image may be filtered, highlighted or otherwise processed to enhance features, etc. In block 508, information regarding operating conditions during acquisition of the measured image can optionally be provided to block 504 and 512. This information may assist in characterizing the processing, filtering or transformation of the images to assist in making these images compatible for future steps.

In block 514, a best alignment match and transformation are computed for enabling alignment between the predictive reference image and the measured image. In block 516, the best/optimal transformation is applied to the measured image or to the layout image. The images are overlaid. In block 518, the overlaid image is analyzed, e.g., the suitability of the actual overly is evaluated. In block 520, a determination is made as to whether the overlay is satisfactory.

If satisfactory, the following or any combination thereof may occur. In block 522, the overlaid images are displayed. In block 524, analyze the measured image based upon the overlay. This may include discovering where emissions are coming from, their magnitude, lack of emissions, etc. In block 526, apply the dimensions to the measured image based on the layout overlay. This may include computing the dimensions or location of components in the overlaid layout image or providing a coordinate system for the overlaid layout image.

If the overlay is not satisfactory, the following or any combination thereof may occur. In block 528, modify the measured image processing (return to block 512). In block 530, modify the operating conditions information (return to block 508). In block 532, modify the layout shapes processing (return to block 504). In block 534, modify the method for creating the predictive reference image (return to block 506). Based on the changes introduced by blocks 528, 530, 532, and 534, an updated "predictive reference" image and/or processed measured image are correlated to improve the matching. The quality of the overlay is then re-evaluated and the optimization loop may be repeated several times until satisfactory matching is achieved.

Figure 12:
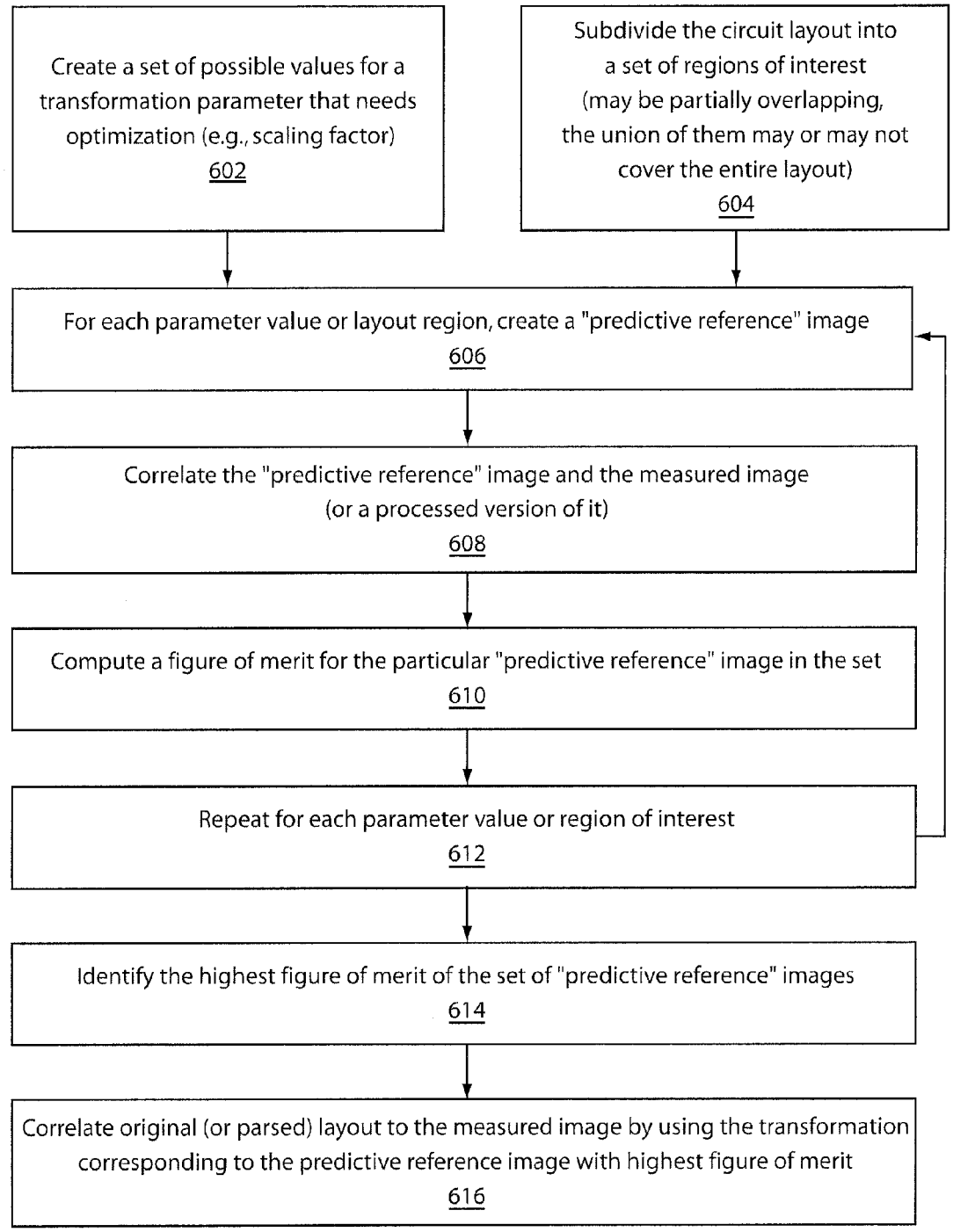
FIG. 12 is a block/flow diagram for a system/method for optimizing and/or correlating a layout with a measured image having feedback for improving the overlay between the layout design and the measured image using figures of merit in accordance with another embodiment.

Referring to FIG. 12, a block/flow diagram shows a method which employs figures of merit to determine an optimal parameter or to reduce the problem to regions of interest. In block 602, a set of possible values for a transformation parameter, such as a scaling factor, rotation, flip orientation etc., that needs optimization are provided. In block 604, a circuit layout is subdivided into a set of regions of interest. The regions may be partially overlapping. A union of the regions may or may not cover the entire layout, as needed. Block 602 and 604 may both be employed or be employed separately as needed or desired in the particular instance.

In block 606, for each parameter value or layout region, create a predictive reference image. In block 608, correlate the predictive reference image and a measured image (or a processed version of the measured image, e.g., filtered, etc.). In block 610, compute a figure of merit for the particular predictive reference image in the set. The figure of merit is an image that represents a result using that parameter or regions so that a comparison may be performed against other figures of merit. In block 612, repeat blocks 606, 608 and 610 for each parameter value or region of interest. In block 614, identify a highest figure of merit for the set of images. In block 616, correlate the original (or parsed) layout to the measured image by using the transformation corresponding to the predictive reference image with highest figure of merit. This yields an optimal parameter for the parameters that were processed or provides a region of interest that includes a particular feature or a largest effect, etc. For example, the scaling factor corresponding to the correlation with the highest figure of merit is chosen as the best match and the corresponding layout and predictive reference image may be used for the overlay with the "measured" image. The layout may be subdivided into several regions of interest to allow for quick processing and correlation with the "measured" image.

Having described preferred embodiments for systems and methods for registering measured images to layout data (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    generating a predictive reference image that represents expected locations of emission spots as if said spots had been acquired in measurement from a layout design or portion thereof;
    correlating the predictive reference image to a measured image obtained from a device having a corresponding structure for the layout design or the portion thereof;
    computing a best match transformation between the predictive reference image and the measured image that corresponds to a highest quality correlation between the predictive reference image and the measured image;
    correlating the layout design or portion thereof with the measured image based upon the best match transformation; and
    applying the best match transformation directly to the layout design.

2. The method as recited in claim 1, wherein generating a predictive reference image includes:
    assigning shapes to components in the layout;
    placing the shapes in relative positions in the layout; and
    assigning pixel values for the shapes to create the predictive reference image.

3. The method as recited in claim 2, wherein assigning pixel values includes assigning a center of the shapes a pixel value greater than zero.

4. The method as recited in claim 2, wherein assigning pixel values includes assigning an area of the shape a pixel value greater than zero.

5. The method as recited in claim 1, further comprising processing the layout image to focus on an area of interest.

6. The method as recited in claim 1, further comprising processing the layout image to match an anticipated scale and orientation of device in the measured image.

7. The method as recited in claim 1, wherein the device in the measured image includes an emissions image of a device under test and the layout design includes a semiconductor chip layout.

8. The method as recited in claim 1, wherein the device in the measured image includes an optical scan image of a device under test and the layout design includes a semiconductor chip layout.

9. The method as recited in claim 1, further comprising analyzing an overlaid image including the layout design or portion thereof and the measured image to determine one or more of component operation or failures, collect statistics and determine operating characteristics.

10. A non-transitory computer readable storage medium comprising a computer readable program, wherein the computer readable program when executed on a computer causes the computer to perform the steps of:

generating a predictive reference image that represents expected locations of emission spots as if said spots had been acquired in measurement from a layout design or portion thereof;

correlating the predictive reference image to a measured image obtained from a device having a corresponding structure for the layout design or the portion thereof;

computing a best match transformation between the predictive reference image and the measured image that corresponds to a highest quality correlation between the predictive reference image and the measured image;

correlating the layout design or portion thereof with the measured image based upon the best match transformation; and applying the best match transformation directly to the layout design.

11. A system, comprising:

an optical instrument including an imaging device for collecting images of a device of interest;

a computer configured to process images collected by the imaging device, the computer including a processor and a memory coupled to the processor, the memory including a tool for registering a layout design to a measured image, the tool configured to:

generate a predictive reference image that represents expected locations of emission spots as if said spots had been acquired in measurement from a layout design or portion thereof;

correlate the predictive reference image to a measured image obtained from the device having a corresponding structure for the layout design or the portion thereof;

compute a best match transformation between the predictive reference image and the measured image that corresponds to a highest quality correlation between the predictive reference image and the measured image;

correlate the layout design or portion thereof with the measured image based upon the best match transformation; and apply the best match transformation directly to the layout design.

12. The system as recited in claim 11, wherein the predictive reference image includes shapes for components in the layout, wherein the shapes are placed in relative positions in the layout such that pixel values are assigned for the shapes to create the predictive reference image.

13. The system as recited in claim 11, wherein the pixel values include at least one of: a center of the shape having a pixel value greater than zero, an area of the shape having a pixel value greater than zero, and a perimeter of the shape having a pixel value greater than zero.

14. The system as recited in claim 11, wherein the processor processes the layout image to match an anticipated scale and orientation of the device in the measured image.

15. The system as recited in claim 11, wherein the device in the measured image includes one of an emissions image and an optical scan image of the device and the layout design includes a semiconductor chip layout.

16. The system as recited in claim 11, further comprising an overlaid image including the layout design or portion thereof and the measured image to determine one or more of component operation or failures, collect statistics and determine operating characteristics.

17. The method of claim 1, wherein the predictive image is an artificial image having a size that is the same as the measured image and that covers the entire layout design.

18. The system of claim 11, wherein the predictive image is an artificial image having a size that is the same as the measured image and that covers the entire layout design.

* * * * *